Jan. 6, 1970 M. FARBER 3,488,434

CONTROL SYSTEM FOR PHOTOSENSITIVE VIDEO RECORDERS

Filed March 24, 1967

United States Patent Office 3,488,434
Patented Jan. 6, 1970

3,488,434
CONTROL SYSTEM FOR PHOTOSENSITIVE VIDEO RECORDER

Monroe Farber, Jericho, N.Y., assignor to Fairchild Camera and Instrument Corporation, a corporation of Delaware Filed Mar. 24, 1967, Ser. No. 625,662
Int. Cl. H04n 5/84
U.S. Cl. 178—6.7 7 Claims

ABSTRACT OF THE DISCLOSURE

Energization of a glow lamp for a photosensitive video recorder is controlled by a negative feed-back path including a photomultiplier responsive to the light from the glow lamp. The gain of the photomultiplier is controlled in accordance with the instantaneous value of the input signal, thereby to compress the amplitude range of the recording illumination with respect to the amplitude range of the input signal.

This invention relates ot a control system for photosensitive video recorders and, more particularly, to such a control system for providing a predetermined density-signal input characteristic.

Background of the invention

The invention is particularly adapted for controlling a video scanner for making monochrome photographic transparencies or prints or color-separation transparencies or prints.

Heretofore, there have been devised a number of circuits for processing or correcting video signals representative of a subject copy to be reproduced, for example as developed by a photoelectric scanner, to compensate for nonlinearities or irregularities of one or more components of the over-all system. The final corrected signal is then utilized to control the exposure of a photographic film or plate for reproduction by photographic or printing processes. Such signal-processing circuits are useful in both monochrome and color reproduction systems, the latter producing color-separation prints or plates.

One such video signal-processing circuit is described and claimed in applicant's prior Patent 3,218,387. The video signal at each of the output terminals 140, 155, 157, and 134 of that patent is representative of the desired dot area of the final photographic or printed reproduction. However, the customer's photographic film or printing plate processes and equipments utilizing such video signals usually have a dot area-density relationship which is both nonlinear and varies from customer to customer and even between different equipments in the plant of a single customer, for example as between gravure, offset, and letterpress printing.

The present invention comprises a control system for utilizing video signals, as from a photoelectric scanner, either with or without signal processing or correction as described above, and providing means for establishing an adjustable predetermined density-signal input characteristic. For example, the control system of the present invention is suitable for utilizing the final corrected video signals developed in the system of applicant's prior Patent 3,218,387. Such a control system is generally referred to as a tone compensation system.

The invention also solves certain problems relating to the normal fatigue of light transducers used in such recorders and scanners and to the nonlinearities, hysteresis effects, and other unwanted variations in responses of such light transducers.

Summary of the invention

In accordance with the invention, there is provided a control system for a photosensitive video recorder comprising a low-inertia light source for illuminating the recorder, an input terminal for supplying a video signal to be recorded, amplifying means coupling the input terminal to the light source for energizing the same, and a negative feed-back path from the light source to the amplifying means including a photoelectric device responsive to the light source and means for controlling the gain of the feed-back path. The control system further comprises a circuit coupling the input terminal to the gain-control means in a sense to vary the gain of the feed-back path in a sense opposite to variations in the instantaneous emplitude of the input video signal, thereby to provide a predetermined density-signal input characteristic. The term "low-inertia light source" is used herein and in the appended claims to refer either to a light source whose radiant flux can be varied as a function of a high-frequency electrical signal, for example a vapor arc or glow lamp, or a light source of constant intensity followed by a low-inertia light modulator, for example a Kerr cell.

For a better understanding of the present invention, together with other and further objects thereof, reference is had to the following description, taken in connection with the accompanying drawing, while its scope will be pointed out in the appended claims.

Brief description of the drawing

FIG. 1 is a schematic diagram of a complete control system for photosensitive video recorders embodying the invention, while

Description of the preferred embodiment

Figure 1:
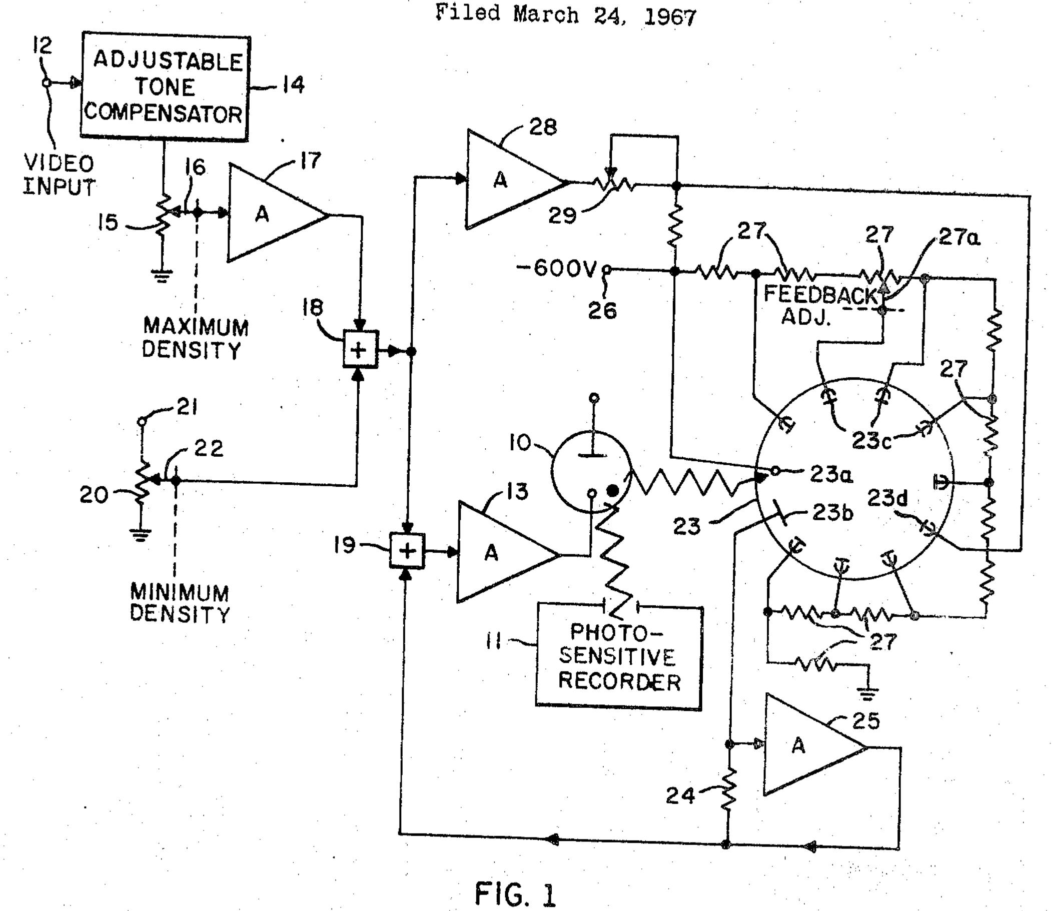

Referring now more particularly to FIG. 1 of the drawing, there is illustrated schematically a control system for a photosensitive video recorder comprising a low-inertia light source for illuminating a photosensitive recorder 11. The low-inertia light source may comprise either a light source of constant intensity followed by a low-inertia electrooptical modulator or, as shown, a low-inertia light source capable of modulation, for example a glow-tube modulator 10 which may be a Sylvania type R1130B. The system includes an input terminal 12 for supplying a video signal to be recorded and amplifying means, such as an amplifier 13, for coupling the input terminal to the light source for energizing the same. This coupling circuit includes an adjustable tone compensator 14 for translating the video signal with an adjustable desired nonlinearity. The tone compensator 14 may be any well-known type of tone adjusting circuit and, since it per se forms no part of the present invention, is shown schematically.

The control system of FIG. 1 further includes adjustable means for setting the maximum energization of the light source for a given maximum video signal. This means may be in the form of a voltage-divider 15 having an adjustable contact 16 connected by way of an amplifier 17, a combining amplifier 18, and a second combining amplifier 19 to the input of amplifier 13. The control system further includes adjustable means for setting the minimum energization of the light source, such means being in the form of a voltage-divider 20 energized from a suitable unidirectional source connected to terminal 21 and having an adjustable contact 22 connected to the combining amplifier 18.

The control system of FIG. 1 further comprises a negative feed-back path from the light source 10 to the amplifier 13 including a photoelectric device responsive to the light source and means for controlling the gain of such feed-back path. Specifically, the photoelectric device may be in the form of a photomultiplier 23 having a cathode 23a, an anode 23b, and a series of dynode electrodes 23c. As indicated, the cathode 23a of the photomultiplier 23 is adapted to be illuminated by the light source 10 while the circuit of its anode 23b includes a load resistor 24 shunted by a feed-back amplifier 25 forming with resistor 24 an operational amplifier. The signal output of the operational amplifier 24, 25 is applied to the combining amplifier 19 wherein it is added to the video signal output of the combining amplifier 18. The photomultiplier 23 is energized from a suitable unidirectional input terminal 26 connected to the cathode 23a and energized from a suitable source, for example −600 v. The several dynodes 23c of the photomultiplier 23 are energized from the input terminal 26 via a voltage-divider comprising the usual string of resistors 27 connected between the terminal 26 and ground. The sixth dynode 23d of the photomultiplier 23 is used as a gain-control electrode.

The control system of FIG. 1 further includes a circuit for coupling the input terminal 12 to the gain-control means, specifically to the gain-control dynode 23d, in a sense to vary the gain of the feed-back path in a sense opposite to variations in the instantaneous amplitude of the input signal, thereby to compress the amplitude range of the recording illumination with respect to the amplitude range of the input video signal. This coupling circuit includes an amplifier 28 coupled to the output of combining amplifier 18 and connected by way of an adjustable resistor 29 to the gain-control dynode 23d. One of the string of resistors 27 is provided with an adjustable tap 27a connected to the second dynode to provide an adjustment of the static feed-back characteristic of the feed-back path including the photomultiplier 23.

Description of operation

Figure 2:
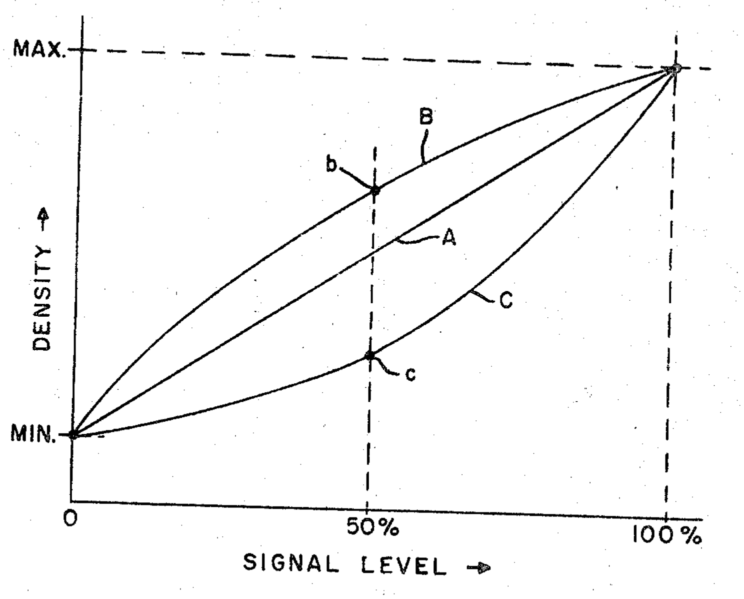
FIG. 2 is a grap to aid in explaining certain operating characteristics of the system of FIG. 1.

The input video signal as applied to the tone compensator 14 is modified to obtain a desired recorded density-versus-input signal characteristic and is adjustable in accordance with the requirements of a particular customer's processing and printing. The characteristics of a typical tone compensator are represented in FIG. 2 in which curve A represents the adjustment of the compensator to give it a linear characteristic; curve B, a characteristic accentuating the incremental contrast at low signal levels; and curve C, a characteristic accentuating incremental contrast for high signal levels. In specifying the characteristic, it is customary in such devices to refer to the deviation of the characteristic from linear at the 50% signal level as indicated by the points b and c, respectively. Such tone compensators or nonlinear translating circuits are well known in the art.

The output of the compensator 14 is applied to a voltage-divider resistor 15 having a tap 16 for setting the maximum density to be recorded, that is, the density recorded assuming a given maximum input video signal. The minimum recording density is set by the adjustable tap 22 of voltage-divider resistor 20 which develops a minimum unidirectional potential overriding any residual noise. These two signals are combined in linear amplifier 18 and passed via combining amplifier 19 and amplifier 13 to energize the light source 10, which is effective to develop illumination of an intensity which accurately and rapidly follows the high-frequency variations of the video signal. This illumination is directed to the photosensitive recorder 11 to make a recording in the form of a photographic transparency or print or a photoelectric engraving.

A fraction of the illumination from the light source 10 is directed to the cathode 23a of photomultiplier 23 and the video signal developed thereby and amplified in the photomultiplier appears across the anode load resistor 24. The feed-back amplifier 25 is effective to convert the extremely small current in the circuit of the anode 23b to a usable voltage at a moderate impedance, as represented by the resistor 24. The polarity of the video signal appearing across resistor 24 is opposite to that of the video signal output of the combining amplifier 18 and these two signals are added in the combining amplifier 19 so that the output of the amplifier 19 is a corrected video signal which, via amplifier 13, controls the energization of the light source 10.

At the same time, the video signal output of amplifier 18 is connected by way of the amplifier 28 and adjustable resistor 29 to the sixth dynode 23d of photomultiplier 23 to control the gain thereof in accordance with the instantaneous variations of the input video signal. Thus, the negative feed-back path including the photomultiplier 23 is effectively a high-frequency negative feed-back path the effect of which is to compress the amplitude range of the video signal applied to the light source 10. With the maximum density and minimum density settings effected by the adjustable contacts 16 and 22, respectively, the effect of the negative feed-back is primarily to increase the minimum video signal amplitude for relatively low-amplitude video input signals without at the same time increasing the maximum video signal amplitude to a point which would overload the recorder or the control system itself.

The control system of the invention has a number of advantages. For example, the use of the operational amplifier 24, 25 in the feed-back path including the photomultiplier 23, by effectively increasing the current in such feed-back path at a relatively low voltage, decreases the capacitive reactance of the anode-cathode circuit of the photomultiplier and its associated circuits so as to minimize the sensitivity of the system to capacitance effects in such feed-back circuit. It is known also that by operating such a photomultiplier at relatively low level anode-cathode current, fatigue effects are minimized.

It has also been found that by the use of the feed-back arrangement described, which is effective to raise the minimum signal level for weak video signal inputs, the minimum signal level is raised substantially above the noise level and is also effective to mask low level shifts in gain in the system due to drifts of components, contact potentials, etc. In addition, a substantial part of the required linearity adjustment can be effected in the control system itself rather than by the use of certain gamma correction circuits involving a series of diodes or equivalent imparting discrete break points to the characteristic of the circuit.

While there has been described what is, at present, considered to be the preferred embodiment of the invention, it will be obvious to those skilled in the art that various changes and modifications may be made therein, without departing from the invention, and it is, therefore, aimed in the appended claims to cover all such changes and modifications which fall within the true spirit and scope of the invention.

What is claimed is:

1. A control system for a photosensitive video recorder comprising:
   - a low-inertia light source for illuminating the recorder;
   - an input terminal for supplying a video signal to be recorded;
   - amplifying means coupling said input terminal to said light source for energizing the same;
   - a negative feed-back path from said light source to said amplifying means including a photoelectric device responsive to said light source; means for controlling the gain of said path; and
   - a circuit coupling said input terminal to said gain-control means in a sense to vary the gain of said feed-back path in a sense opposite to variations in the instantaneous amplitude of the input video signal, thereby to provide a predetermined density-signal input characteristic.

2. A control system in accordance with claim 1 in which the light source is a xenon arc lamp.

3. A control system in accordance with claim 1 including adjustable means for setting the maximum energization of said light source for a given maximum video signal.

4. A control system in accordance with claim 1 including adjustable means for setting the minimum energization of said light source.

5. A control system in accordance with claim 1 which includes an adjustable tone compensator interposed between said input terminal and said light source for adjusting the gamma of the video signal.

6. A control system in accordance with claim 1 in which said photoelectric device has a gain-control electrode and the means for controlling the gain of said feed-back path includes means for controlling the bias on said electrode.

7. A control system in accordance with claim 1 which includes a linear combining amplifier to which are applied the input video signal and the signal from said feed-back path.

References Cited

UNITED STATES PATENTS

| | | | |
|---|---|---|---|
| 2,804,498 | 8/1957 | Theile | 250—205 |
| 3,340,360 | 9/1967 | Celio et al. | 178—6.7 |
| 2,989,585 | 6/1961 | Schroter. | |
| 3,030,443 | 4/1962 | Groll et al. | |
| 3,119,970 | 1/1964 | Thompson et al. | 330—136 |
| 2,804,550 | 8/1957 | Artzt. | |

RICHARD MURRAY, Primary Examiner

B. LEIBOWITZ, Assistant Examiner

U.S. Cl. X.R.

250—205, 206